(12) United States Patent
Tang et al.

(10) Patent No.: US 12,409,475 B2
(45) Date of Patent: Sep. 9, 2025

(54) SIDE-BY-SIDE PARCEL SEPARATION DEVICE AND METHOD THEREOF

(71) Applicant: KENGIC INTELLIGENT TECHNOLOGY CO., LTD, Qingdao (CN)

(72) Inventors: Bing Tang, Qingdao (CN); Xu Sun, Qingdao (CN); Jiahao Jiang, Qingdao (CN); Yuanfei Xu, Qingdao (CN)

(73) Assignee: KENGIC INTELLIGENT TECHNOLOGY CO., LTD, Qingdao (CN)

( * ) Notice: Subject to any disclaimer, the term of this patent is extended or adjusted under 35 U.S.C. 154(b) by 778 days.

(21) Appl. No.: 17/779,568

(22) PCT Filed: Jun. 12, 2020

(86) PCT No.: PCT/CN2020/095702
§ 371 (c)(1),
(2) Date: May 25, 2022

(87) PCT Pub. No.: WO2021/103487
PCT Pub. Date: Jun. 3, 2021

(65) Prior Publication Data
US 2023/0012156 A1    Jan. 12, 2023

(30) Foreign Application Priority Data
Nov. 25, 2019  (CN) .......................... 201911168246.9

(51) Int. Cl.
*B07C 3/08* (2006.01)
*B07C 3/14* (2006.01)
*B65G 47/31* (2006.01)

(52) U.S. Cl.
CPC ................. *B07C 3/08* (2013.01); *B07C 3/14* (2013.01); *B65G 47/31* (2013.01)

(58) Field of Classification Search
CPC .. B07C 3/08; B07C 3/14; B07C 3/003; B07C 3/008; B65G 47/31
See application file for complete search history.

(56) References Cited

U.S. PATENT DOCUMENTS

| | | | |
|---|---|---|---|
| 6,971,580 B2 * | 12/2005 | Zhu ..................... | G06K 7/10871 235/472.01 |
| 9,038,810 B2 * | 5/2015 | Schroader ............ | B65G 47/682 198/407 |

(Continued)

FOREIGN PATENT DOCUMENTS

| | | |
|---|---|---|
| CN | 109335611 A | 2/2019 |
| CN | 109368223 A | 2/2019 |

(Continued)

*Primary Examiner* — Michael Collins
(74) *Attorney, Agent, or Firm* — Bayramoglu Law Offices LLC (57) ABSTRACT

A side-by-side parcel separation method is provided. The side-by-side parcel separation method includes the following steps: dispersion: dispersing, by an angle difference existing in a conveying direction, parcels arriving at a dispersion device from a conveying line, wherein a gap is reserved between adjacent parcels; detection and recognition: photographing and recognizing detected parcels by a visual recognition device to obtain a three-dimensional size and real-time position data of each parcel; separation: applying different conveying speeds to the adjacent parcels by a separation device, arriving, by a first parcel-recognized to be at a front position, at a side-approaching device at a fast speed, and repeating the foregoing steps; and single-row queuing: forwardly conveying, in a single-row queuing mode, different parcels arriving at the side-approaching device in sequence. A separation device for implementing the side-by-side parcel separation method is also provided.

13 Claims, 7 Drawing Sheets

(56) References Cited

U.S. PATENT DOCUMENTS

| | | | | |
|---|---|---|---|---|
| 2005/0259847 A1* | 11/2005 | Genc | ................... | G06T 7/12 |
| | | | | 382/103 |
| 2010/0082152 A1* | 4/2010 | Mishra | ................... | H04N 7/18 |
| | | | | 700/226 |
| 2016/0031657 A1* | 2/2016 | Cristoforetti | .......... | B65G 47/30 |
| | | | | 198/448 |

FOREIGN PATENT DOCUMENTS

| | | | |
|---|---|---|---|
| CN | 109879025 A | 6/2019 | |
| CN | 110961361 A | 4/2020 | |
| JP | 2005022846 A | 1/2005 | |
| JP | 2015113183 A | 6/2015 | |

\* cited by examiner

SIDE-BY-SIDE PARCEL SEPARATION DEVICE AND METHOD THEREOF

CROSS REFERENCE TO THE RELATED APPLICATIONS

This application is the national stage entry of International Application No. PCT/CN2020/095702, filed on Jun. 12, 2020, which is based upon and claims priority to Chinese Patent Application No. 201911168246.9, filed on Nov. 25, 2019, the entire contents of which are incorporated herein by reference.

TECHNICAL FIELD

The invention relates to a side-by-side parcel separation device and method to implement high-speed sorting of goods, belonging to the field of logistics sorting.

BACKGROUND

At a current logistics sorting operation site of e-commerce and express delivery industries, a front-end manual feeding operation mode is usually adopted, that is, a large number of parcels entering a conveying line in piles are manually separated to facilitate subsequent scanning and information entry.

According to a front-end manual feeding method of a high-speed sorting machine, several workers are needed. Sorting equipment usually runs at a high speed and cannot be shut down, so correspondingly, the requirement for manual feeding workers is quite high, and the labor intensity on the site is also high. If the feeding speed drops in the process, a backlog of goods will be caused since there are still a large number of goods in piles waiting to enter the subsequent scanning and sorting stages, which increases the pressure of scanning and sorting operations; moreover, a large number of unrecognized goods entering the feeding and scanning procedures again will directly affect the processing efficiency of the sorting operation overall, prolong the working time of the whole equipment and reduce the sorting efficiency and capacity of a logistics system.

In previous Patent Application No. CN201910162842.X entitled "Side-by-Side Object Separation Method and Device", the side-by-side object separation device comprises a plurality of strip-shaped conveyor belts arranged side by side, a plurality of motors and a control unit, and the motors are in one-to-one correspondence with the strip-shaped conveyor belts. The method comprises: when a first object and a second object are detected to be side by side, acquiring, by the control unit, first position information of the first object and second position information of the second object, and controls, by the motors, a first strip-shaped conveyor belt set and a second strip-shaped conveyor belt set to run at different transmission speeds, so that the first object is separated from the second object. In the separation device, spacing grooves are arranged between adjacent strip-shaped conveyor belts, photoelectric sensors are arranged in the spacing grooves, the spacing grooves are located at upstream positions of conveying paths of objects on the strip-shaped conveyor belts, and the plurality of photoelectric sensors are connected with the control unit. A first motor set is used to control the first strip-shaped conveyor belt set to transport the first object at a first speed, and a second motor set is used to control the second strip-shaped conveyor belt set to transport the second object at a third speed, wherein the third speed is smaller than the first speed.

The scheme of this previous application has the following defects: 1. The prior application fails to sufficiently disclose how to carry out limited spacing on the parcels to be detected and separated before entering different strip-shaped conveyor belts formed by adjacent spacing grooves? or pretreatment by manual sorting is still required? and deficiencies exist in terms of the specific application of the separation technology. 2. The recognition of various position relationships between adjacent parcels and subsequent separation have not been solved, and problems are solved to a limited extent and need to be further solved. 3. Separation by sensor signal triggering is slow, and existing on-site high-speed and batch parcel processing requirements can hardly be met. 4. The separated parcels are still in a discrete state, which is not conducive to subsequent separate code scanning, and the omission ratio is still large.

In view of this, this patent application is hereby filed.

SUMMARY

A side-by-side parcel separation device and method of the invention aim to solve the above-mentioned problems in the prior art by firstly dispersing parcels to generate gaps, and then taking photos and recognizing the position relationship between adjacent parcels by means of an image recognition algorithm, so as to separate the foremost parcels one by one, realize high-speed separation and single-queue transportation of batched parcels, realize the maximum rate of subsequent separate code scanning, reduce the omission ratio and improve overall sorting efficiency.

In order to achieve the above design purpose, the side-by-side parcel separation method described in this application mainly comprises the following implementation steps:

1) dispersion
   dispersing, by means of an angle difference existing in a conveying direction, parcels arriving at a dispersion device from a conveying line, wherein a gap is reserved between adjacent parcels;
2) detection and recognition
   photographing and recognizing detected parcels by means of a visual recognition device so as to obtain the three-dimensional size and the real-time position data of each parcel;
   wherein the visual recognition device performs edge detection on parcel images according to an image recognition algorithm, and screens out 3D coordinates and position information of the parcel corresponding to edge information of the parcel;
   dimension coordinates of an outermost part of the parcel in the conveying direction are defined as a current position of the parcel;
3) separation
   applying different conveying speeds to the recognized adjacent parcels by means of a separation device;
   arriving, by a first parcel that is recognized to be at a front position, at a side-approaching device at a fast speed, and repeating the foregoing steps; and
4) single-row queuing
   forwardly conveying, in a single-row queuing mode, different parcels that arrive at the side-approaching device in sequence.

Further, in the separation stage, if several parcels share the same position information, the size information of the parcels is compared, and the parcel with the largest size is identified as the first parcel, and so on.

The visual recognition device is installed in a direction perpendicular to the parcel conveying direction. The visual recognition device comprises a 3D camera.

The dispersion device comprises a plurality of scattering belt conveyors which are arranged in a divergent state in the conveying direction, and are driven separately by a plurality of servo motors.

The separation device comprises a plurality of separating belt conveyors arranged into a matrix in the conveying direction, and each separating belt conveyor is separately driven by one servo motor. A motor speed of the belt conveyor conveying the first parcel recognized by means of the image recognition algorithm is increased, motor speeds of the belt conveyors conveying the parcels behind are reduced or rotation is stopped until the first parcel completely exceeds other parcels, and so on, so that all the parcels are transported to the side-approaching device separately in sequence.

The side-approaching device is an inclined barrel roll. Different parcels arriving at the side-approaching device are delivered to one side in a conveying direction of a roller to form a single-row queue.

Based on the application of the side-by-side parcel separation method mentioned above, the application also proposes a separation device with the following structure: a dispersion device, a visual recognition device, a separation device and a side-approaching device are arranged in a conveying direction; the visual recognition device is arranged in a direction perpendicular to the parcel conveying direction and comprises a 3D camera; the dispersion device comprises a plurality of scattering belt conveyors which are arranged in a divergent state in the conveying direction, and are driven separately by a plurality of servo motors;

the separation device comprises a plurality of separating belt conveyors arranged into a matrix in the conveying direction, and each separating belt conveyor is separately driven by one servo motor; and the side-approaching device is an inclined barrel roll.

Further, each scattering belt conveyor comprises a plurality of groups of V belts driven by servo motors, the plurality of groups of V-belts are connected to a V-belt axle through cross universal couplings, and the servo motors drive the V-belt axle through a synchronous belt wheel and a synchronous belt.

Further, each separating belt conveyor comprises a conveyor belt driven by a servo reducer and belt wheels, a tensioning belt is disposed around the belt wheels on two sides, and the tensioning belt is sequentially connected to a driving roller, a tensioning roller installed on a tensioning crank shaft, a tensioning handle and a spring.

To sum up, the side-by-side parcel separation device and method have the advantages that:

1. A large number of parcels can automatically enter the separation device without manual intervention and pre-disposal, so the device and method can meet the full-automatic operation requirement of high-speed sorting machines, and manual feeding is not required any more.

2. Labor input can be greatly reduced, the working intensity and workload of labor workers are reduced, and the requirements for personnel are lowered.

3. The image recognition algorithm is used to recognize and calculate the position relationship between adjacent parcels, so as to improve the accuracy and efficiency of one-by-one separation, and the reliability of the separation method is improved to the greatest extent.

4. The shortcomings of the prior art are overcome, and the scheme is more fully disclosed and has a broader application prospect, so it is conducive to improving the full automation level of the sorting operation.

BRIEF DESCRIPTION OF THE DRAWINGS

The invention will now be further explained with reference to the following drawings.

DETAILED DESCRIPTION OF THE EMBODIMENTS

In a first embodiment, a side-by-side parcel separation method described in this application comprises the following implementation steps:

1) dispersion dispersing, by means of an angle difference existing in a conveying direction, parcels arriving at a dispersion device from a conveying line, wherein a gap is reserved between adjacent parcels;

2) detection and recognition installing a visual recognition device in a direction perpendicular to the parcel conveying direction, the visual recognition device comprising a 3D camera;

photographing and recognizing detected parcels by means of a visual recognition device so as to obtain the three-dimensional size and the real-time position data of each parcel;

wherein the visual recognition device performs edge detection on package images according to an image recognition algorithm, and screens out 3D coordinates and position information of the package corresponding to edge information of the package;

dimension coordinates of an outermost part of the parcel in the conveying direction are defined as a current position of the parcel;

3) separation applying different conveying speeds to the recognized adjacent parcels by means of a separation device;

wherein if several parcels share the same position information, size information of the parcels is compared, and the parcel with a largest size is identified as the first parcel, and so on;

arriving, by a first parcel that is recognized to be at a front position, at a side-approaching device at a fast speed, and repeating the foregoing steps; and 4) single-row queuing forwardly conveying, in a single-row queuing mode, different parcels that arrive at the side-approaching device in sequence.

In the above method, the separation device comprises a plurality of separating belt conveyors arranged into a matrix in the conveying direction, and each separating belt conveyor is separately driven by a servo motor;

a motor speed of the belt conveyor conveying the first parcel recognized by means of the image recognition algorithm is increased;

motor speeds of the belt conveyors conveying the parcels behind are reduced or rotation is stopped until the first parcel completely exceeds other parcels;

and so on, so that all the parcels are transported to the side-approaching device separately in sequence.

In the above method, the side-approaching device is an inclined barrel roll, and different parcels arriving at the side-approaching device are delivered to one side in a conveying direction of a roller to form a single-row queue.

Figure 1:
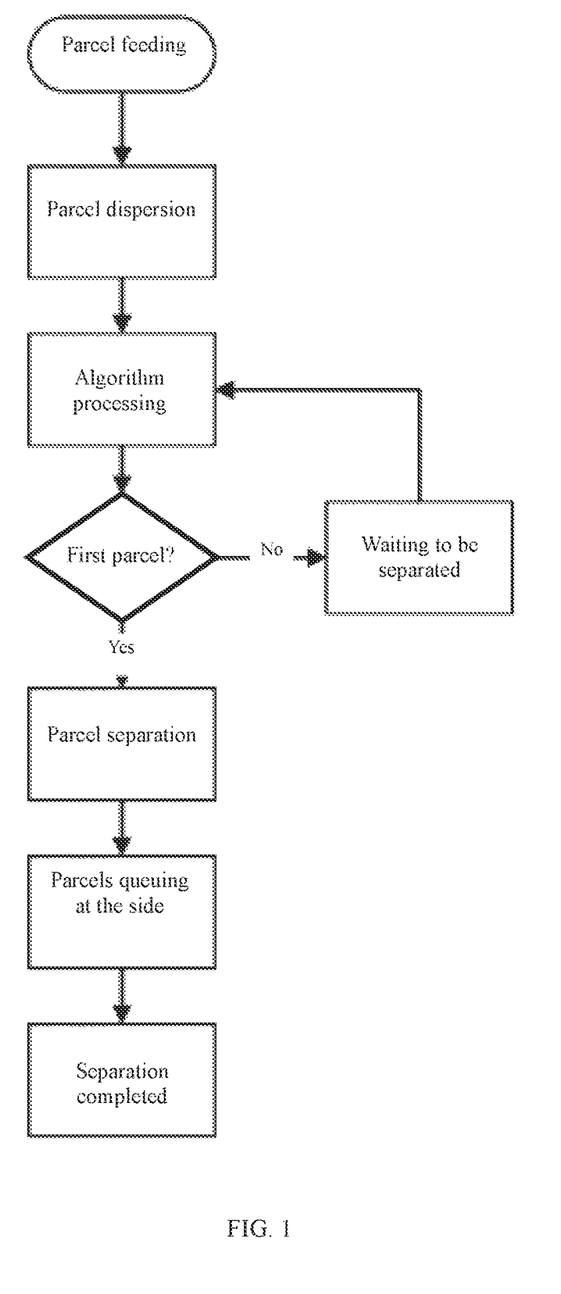
FIG. 1 is a flowchart of a side-by-side parcel separation method described in this application.

As shown in FIG. 1, the principle and main process of single-piece separation of side-by-side parcels are as follows: firstly, when a parcel set is fed from a belt conveyor and transported to a scattering belt conveyor, the scattering belt conveyor will disperse the parcels by means of an angle difference in a forward direction, so that when parcels sticking to each other move to a separating belt conveyor, gaps are generated between adjacent parcels, enabling an algorithm to identify different parcels; when there are multiple parcels on the separating belt conveyor at the same time, a visual controller will obtain current position information of the parcels through a camera, and identifies whether the parcels are a first parcel set or a second parcel set through the algorithm, wherein a first parcel is always the parcel or parcel set at the foremost position in the parcel conveying direction; when the parcel is identified as the first parcel, a PLC will give a high-speed operation instruction to a belt drive motor corresponding to the first parcel, while a low-speed operation instruction or a zero-speed operation instruction is given to a belt drive motor corresponding to a second parcel, so that the first parcel is separated from the second parcel by a distance greater than a side-by-side distance within a certain period of time, that is, enabling the first parcel set to be separated from the second parcel set, and then the position information of the second parcel is fed back to the visual controller to continue the algorithm processing and wait for separation instructions; at the same time, the separated first parcel leaves the separating belt conveyor at a high speed and enters a side-approaching roller, realizing forward transportation of parcels in a queue through the side-approaching roller.

The 3D camera installed perpendicular to the conveying direction detects the three-dimensional size and real-time position of the parcel, so as to distinguish the parcel. The visual control unit identifies the objects on the belt conveyor according to the image recognition algorithm. The image recognition algorithm can perform edge detection on the image and screen out the edge information of the parcel from the edge detection data of the image, and the edge information is the coordinates of a parcel outline.

Dimension coordinates of the outermost part of the parcel in the conveying direction are defined as the current position of the parcel. This position information is an important input condition for the algorithm to determine the sequence of parcel separation, that is, the parcel at the foremost position in the parcel conveying direction is defined as the first parcel, and other parcels on the separating belt conveyor at the same time except the first parcel are defined as the second parcel set.

Figure 2:
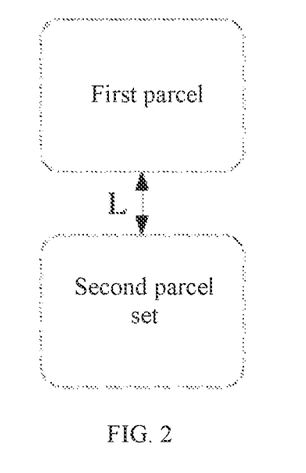
FIG. 2 is a diagram of a first example of parcel position distribution.

There may be the following situations:

In a first situation, the position distribution of the first parcel and the second parcel set is shown in FIG. 2, when L>10 mm, the algorithm determines that two parcels exist and the first parcel and the second parcel set do not have a side-by-side relationship, and a system determines that the first parcel can be separated in the current state.

Figure 3:
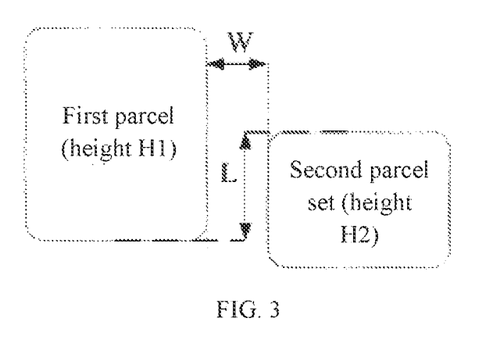
FIG. 3 is a diagram of a second example of parcel position distribution.

In a second situation, the position distribution of the first parcel and the second parcel set is shown in FIG. 3, when L>−10 mm and W>10 mm, the algorithm determines that two parcels exist and the first parcel and the second parcel set have a side-by-side relationship, and the system determines that the first parcel can be separated in the current state.

In a third situation, the position distribution of the first parcel and the second parcel set is shown in FIG. 3, when L>−10 mm and W<10 mm and |H1-H2|>10 mm, the algorithm determines that two parcels exist and the first parcel and the second parcel set have a side-by-side relationship, and the system determines that the first parcel can be separated in the current state.

In a fourth situation, the position distribution of the first parcel and the second parcel set is shown in FIG. 3, when L>−10 mm and W<10 mm and |H1-H2|<10 mm, the algorithm determines that one parcel exists. This situation is called parcel sticking. The system determines that the first parcel can be separated in the current state. The parcels sticking to each other wait for an algorithm processing result in the next time period and a separation instruction.

Figure 4:
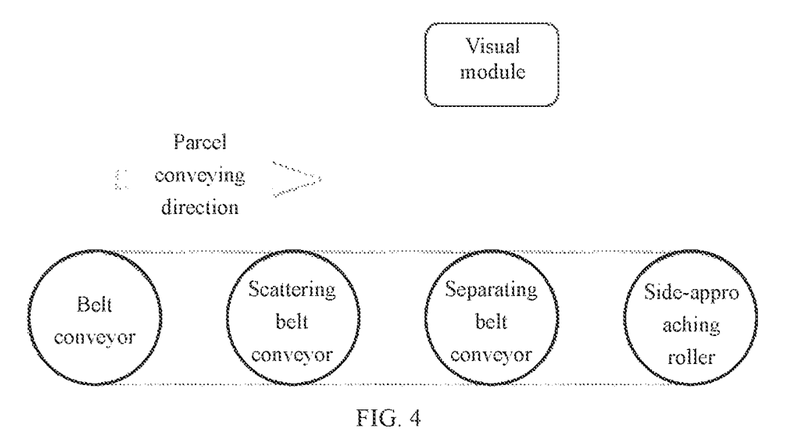
FIG. 4 is a module diagram of a side-by-side parcel separation device described in this application.
Figure 5:
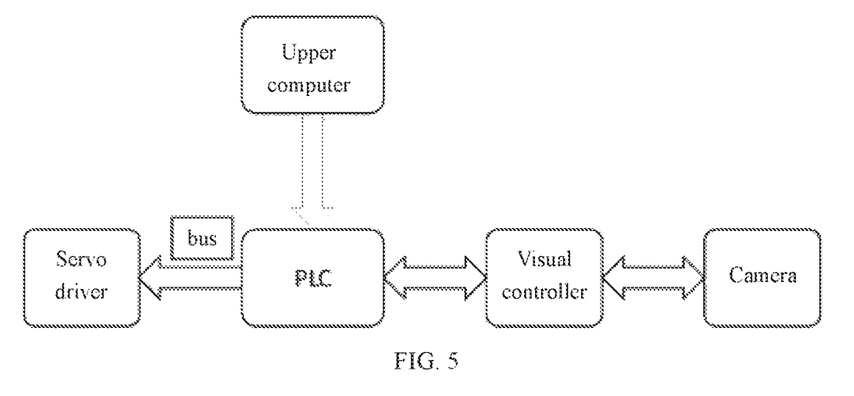
FIG. 5 is a diagram of a control system of a side-by-side parcel separation device.

As shown in FIGS. 4 and 5, the side-by-side parcel separation method described in this application achieves the separation purpose by controlling a belt conveyor set at the bottom of the side-by-side parcels to run at different speeds.

The side-by-side parcel separation device further comprises a control system consisting of an upper computer, a PLC, a visual module and servo motors, wherein the servo motors drive the separating belt conveyor and the scattering belt conveyor respectively, parcel feeding is performed by the belt conveyor, and parcel discharge is performed by the side-approaching barrel roll.

In the control communication of the whole separation device, the upper computer and the visual controller send instructions to the PLC, the PLC sends instructions to the servo motors to drive and control the separating belt conveyor to run at a corresponding speed, and the PLC also sends instructions to the visual controller to trigger the camera to take photos.

Specifically, the visual controller detects the real-time position information of the parcel through the 3D camera. By comparing the position information, the parcel at the foremost position in the parcel conveying direction is identified as the first parcel, belts corresponding to the first parcel are the first belt set, belts corresponding to other parcels are the second belt set, a rotating speed of a servo motor corresponding to the first belt set is a first speed, a rotating speed of a servo motor corresponding to other belt sets is a second speed, and the first speed should be greater than the second speed. Parcel separation can be realized by controlling the speeds of the belt drive motors corresponding to different parcels.

When the visual controller detects that the separation distance between parcels is greater than the side-by-side distance, it means that current separation has been completed, and the position information of the next group of parcels will be compared before control, so that side-by-side parcel separation can be completed in the same way.

If parcel sorting is too large, the algorithm determines that the first parcel set and the second parcel set cannot be separated during moving, and the controller will give a high-speed instruction to the belt drive motor corresponding to the first parcel set and a 0-speed instruction to the belt drive motor corresponding to the second parcel set. When the distance between the first parcel and the second parcel is greater than the side-by-side distance, the controller will give a low-speed instruction to the belt drive motor corresponding to the second parcel set through the PLC, and the second parcel set will be separated subsequently.

Figure 6A:
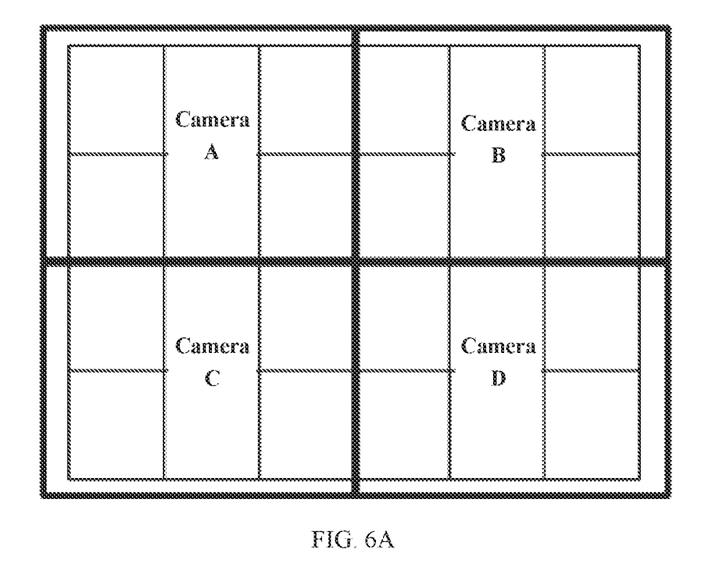
FIGS. 6A-6F are diagrams showing a side-by-side parcel separation control process.

As shown by a side-by-side parcel separation control process in FIGS. 6A-6F, the process of detection and recognition by the visual recognition device comprises the following steps:

1) Camera splicing

In FIG. 6A, because the area of the separating belt conveyor is too large, which exceeds the effective field of view of a single 3D camera, and the effective field of view of a single camera is larger than ¼ and less than ½ of the area of the separating belt conveyor, four 3D cameras are used for visual splicing, and the repeated parts of photos are removed through visual algorithm comparison, so that a complete top view picture of the separating belt conveyor at one time point can be obtained (camera splicing is initially completed, and the visual detection boundary needs to be divided later).

Figure 6B:
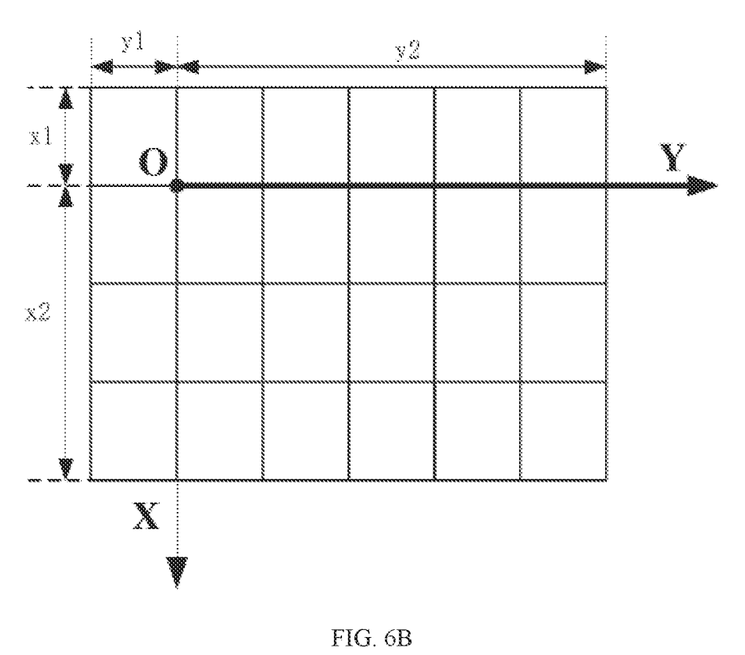
Figure 6C:
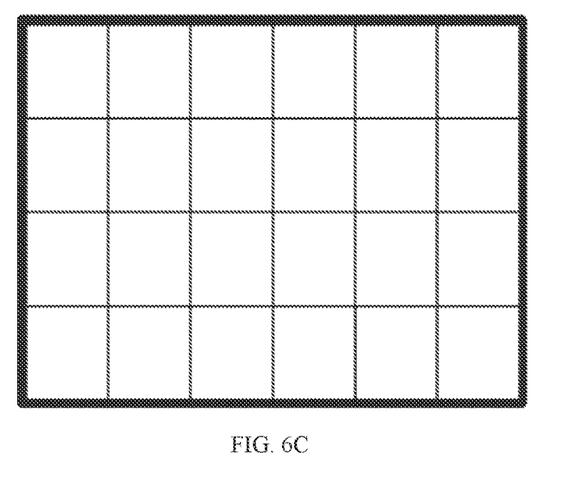

2) Coordinate setting and visual detection boundary division

In FIG. 6B, a point O on the separation belt is selected as zero coordinates, positive directions of X axis and Y axis are selected, then data of the distances from the coordinate origin O of the separating belt conveyor to belt edges x1, x2, y1, y2 are measured, and the measured data are input into a visual control algorithm to obtain the visual detection boundary as shown in FIG. 6C.

Figure 6D:
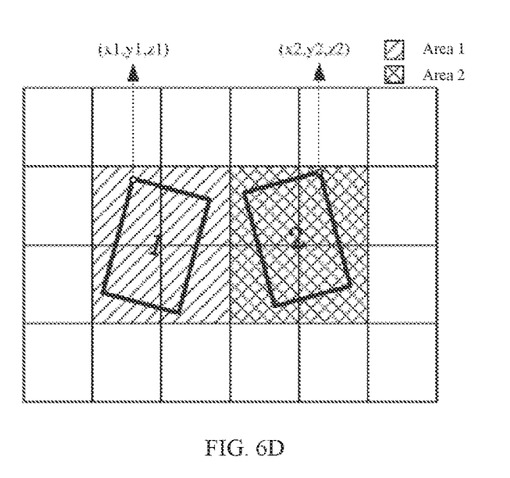

3) Parcel boundary calibration and coordinate information

In FIG. 6D, when a parcel appears in the field of view of the camera, the camera will frame the peripheral boundary of the parcel, as shown by the black bold outline, where the coordinates x, y represent the position of the parcel on the separating belt conveyor, and z represents height information of the parcel. The peripheral boundary of the parcel captured by the camera contains a plurality of pieces of coordinate information, which is an important basis for the algorithm to determine the sequence of parcel separation. The belt conveyor corresponding to parcel 1 is shown in Area 1 in FIG. 6D, and the belt conveyor corresponding to parcel 2 is shown in Area 2 in FIG. 6D. The visual controller controls the belt conveyors in different areas to operate at different speeds by sending instructions to the PLC, so as to realize parcel separation through the speed difference. When side-by-side parcels exist on the separating belt conveyor at the foremost position of the parcel conveying direction, the camera will capture the boundary size coordinates of the two parcels, where $\{x1, y1, z1\}$ represents a coordinate set of Parcel 1 and $\{x2, y2, z2\}$ represents a coordinate set of Parcel 2. There are many cases of parcel separation.

Figure 6E:
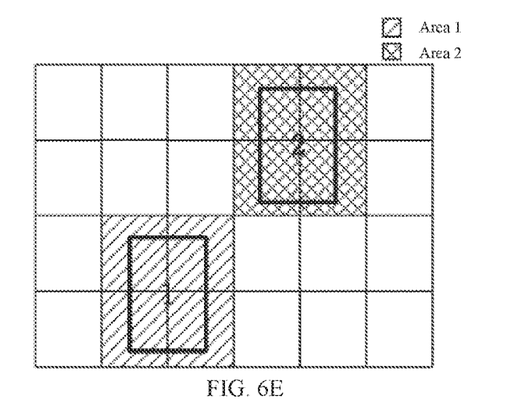

In a first case, as shown in FIG. 6E, when no side-by-side parcels exist at the foremost position of the parcel conveying direction, that is to say, it is assumed that (x2a, y2a, z2a) is a point on the coordinate set of Parcel 2, (x1a, y1a, z1a) is a point on the coordinate set of parcel 1, $\forall$(x2a, y2a, z1a)$\in$(x2, y2, z2), (x1a, y1a, z1a)$\in$(x1, y1, z1), and x2a<x1a all the time. At this point, the visual controller will send a high-speed instruction to the PLC to control the servo motor of Area 2 corresponding to parcel 2 to run at a high speed, and the parcel set of Parcel 1 will be subjected to subsequent algorithm processing and waits to be separated.

Figure 6F:
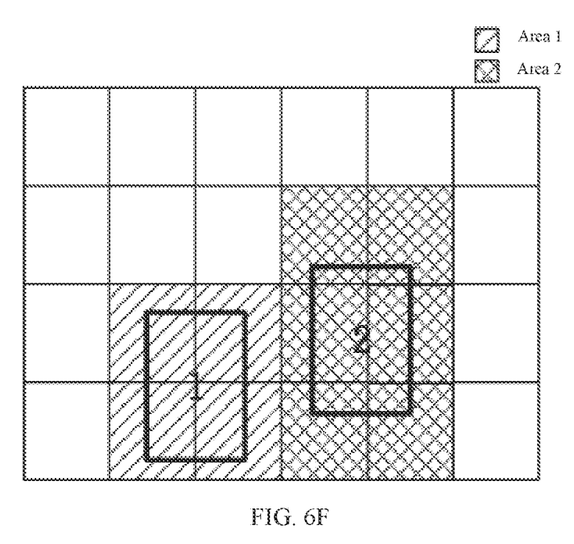

In a second case, as shown in FIG. 6F, when side-by-side parcels exist at the foremost position of the parcel conveying direction, that is to say, it is assumed that (x2a, y2a, z2a) and (x2b, y2b, z2b) are points on the coordinate set of Parcel 2, (x1a, y1a, z1a) and (x1b, y1b, z1b) are points on the coordinate set of Parcel 1, (x2a, y2a, z2a)$\in$(x2, y2, z2), (x2b, y2b, z2b)$\in$(x2, y2, z2); (x1a, y1a, z1a)$\in$(x1, y1, z1), (x1b, y1b, z1b)$\in$(x1, y1, z1), $\exists$x1a<x2a, and $\exists$x1b>x2b. At this point, Parcel 1 and Parcel 2 are called side-by-side parcels. Assuming that a point (x2c, y2c, z2c) exists on Parcel 2, for any point (x1c, y1c, z1c) on Parcel 1, x2 c<x1c, which is mathematically expressed as $\exists$(x2c, y2c, z2c)$\in$(x2, y2, z2), $\forall$(x1c, y1c, z1c)$\in$(x1, y1, z1), and x2c<x1c. At this point, the algorithm determines that the separation priority of Parcel 2 is higher than that of Parcel 1, and the visual controller controls the PLC to send a high-speed instruction to the servo motor corresponding to Area 2, and a low-speed instruction to the high-speed motor corresponding to Area 1. After running for a while, when at a certain point, $\forall$(x1d, y1d, z1d)$\in$(x1, y1, z1), $\forall$(x2d, y2d, z2d)$\in$(x1, y1, z1), x1d-x2d≥10, it is determined that the separation of Parcel 2 and Parcel 1 has been completed, and Parcel 1 and subsequent parcels are similarly subjected to algorithm processing and wait to be separated.

In another special case for side-by-side parcel separation, when the algorithm determines that the separation priority of Parcel 2 is higher than that of Parcel 1 but the distance from Parcel 1 and Parcel 2 to the edge of the separating belt conveyor is too short to complete separation during moving, the visual controller will control the PLC to send a high-speed instruction to the servo motor corresponding to Area 2 and a zero-speed instruction to the servo motors corresponding to other areas than Area 2. After the separation of Parcel 2 is completed, the vision controller will send instructions to the PLC to control the servo motors corresponding to parcels in other areas to run at a low speed, so as to separate parcels in the same way.

In order to realize the above separation method, the side-by-side parcel separation device is provided with a dispersion device, a visual recognition device, a separation device and a side-approaching device in the conveying direction. Where, the visual recognition device is installed in a direction perpendicular to the parcel conveying direction and comprises a 3D camera;
  the dispersion device comprises a plurality of scattering belt conveyors which are arranged in a divergent state in the conveying direction, and are driven separately by a plurality of servo motors;
  the separation device comprises a plurality of separating belt conveyors arranged into a matrix in the conveying direction, and each separating belt conveyor is separately driven by one servo motor; and
  the side-approaching device is an inclined barrel roll.

Figure 7:
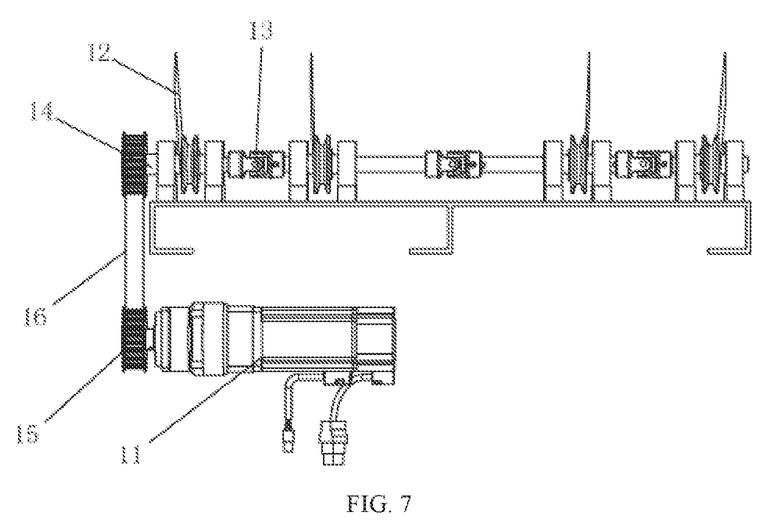
FIG. 7 is a diagram of a transmission mechanism of a single scattering belt conveyor.

As shown in FIG. 7, each scattering belt conveyor comprises 12 narrow belt conveyors arranged in a divergent state at certain angles. Every four narrow belt conveyors form a group. The scattering belt conveyor is driven by three servo motors in total.

A first narrow belt conveyor comprises a plurality of groups of V belts 12 driven by a servo motor 11, the plurality of groups of V-belts 12 are connected to a V-belt axle 14 through cross universal couplings 13, and the servo motor 11 drives the V-belt axle 14 through a synchronous belt wheel 15 and a synchronous belt 16.

Figure 8:
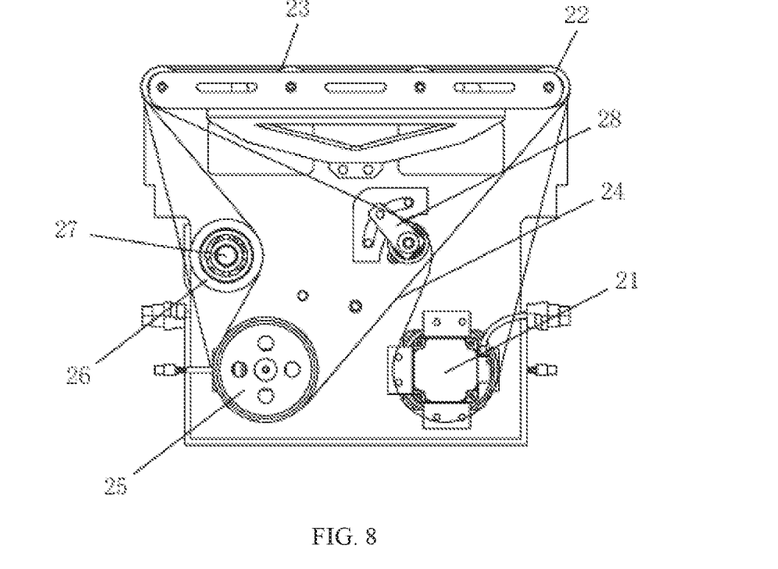
FIG. 8 is a diagram of a lateral structure of a single separating belt conveyor.

As shown in FIG. 8, each separating belt conveyor consists of 24 small belt conveyors arranged into a matrix, each of which is driven by a servo system, and can be subjected to speed adjustment separately.

Each small belt conveyor comprises a conveyor belt 23 driven by a servo reducer 21 and belt wheels 22, a tensioning belt 24 is disposed around the belt wheels 22 on two sides, and the tensioning belt 24 is sequentially connected to a driving roller 25, a tensioning roller 26 installed on a tensioning crank shaft 27, a tensioning handle and a spring 28.

The tensioning roller 26 is self-tightened under the pulling force of the tensioning handle and the spring 28, which not only saves the space reserved for manual adjustment of a tensioning structure so as to make the structure more compact, but also realizes automatic tightening without manual maintenance.

To sum up, the embodiments given in conjunction with the drawings are only preferred schemes. Other alternative structures, conforming to the design concept of the invention, directly deduced by those skilled in the art under the enlightenment of the above embodiments should also belong to the scheme scope of the invention.

What is claimed is:

1. A side-by-side parcel separation method, comprising the following steps:
   1) dispersion
   dispersing, by an angle difference existing in a conveying direction, parcels arriving at a dispersion device from a conveying line, wherein a gap is reserved between adjacent parcels;
   2) detection and recognition
   photographing and recognizing detected parcels by a visual recognition device to obtain a three-dimensional size and real-time position data of each parcel;
   wherein the visual recognition device performs an edge detection on parcel images according to an image recognition algorithm, and screens out 3D coordinates and position information of a parcel corresponding to edge information of the parcel;
   dimension coordinates of an outermost part of the parcel in the conveying direction are defined as a current position of the parcel;
   3) separation
   applying different conveying speeds to recognized adjacent parcels by a separation device,
   arriving, by a first parcel recognized to be at a front position, at a side-approaching device at a fast speed, and repeating the foregoing steps; and
   4) single-row queuing
   forwardly conveying, in a single-row queuing mode, different parcels arriving at the side-approaching device in sequence.

2. The side-by-side parcel separation method according to claim 1, wherein in the step of separation, when the detected parcels share identical position information, size information of the detected parcels is compared, and a largest parcel is identified as the first parcel.

3. The side-by-side parcel separation method according to claim 2, wherein the visual recognition device is installed in a direction perpendicular to the conveying direction; and the visual recognition device comprises a 3D camera.

4. The side-by-side parcel separation method according to claim 1, wherein the dispersion device comprises a plurality of scattering belt conveyors arranged in a divergent state in the conveying direction, and the plurality of scattering belt conveyors are driven separately by a plurality of servo motors.

5. The side-by-side parcel separation method according to claim 4, wherein the separation device comprises a plurality of separating belt conveyors arranged into a matrix in the conveying direction, and each separating belt conveyor is separately driven by a servo motor;
   a motor speed of a separating belt conveyor conveying the first parcel, recognized by the image recognition algorithm, is increased;
   motor speeds of the plurality of separating belt conveyors conveying the parcels behind are reduced or rotation is stopped until the first parcel completely exceeds other parcels;
   the parcels are transported to the side-approaching device separately in sequence.

6. The side-by-side parcel separation method according to claim 5, wherein the side-approaching device is an inclined barrel roll, and
   the different parcels arriving at the side-approaching device are delivered to one side in a conveying direction of a roller to form a single-row queue.

7. A separation device for implementing the side-by-side parcel separation method according to claim 1, wherein the separation device is provided with the dispersion device, the visual recognition device, the separation device and the side-approaching device in the conveying direction; wherein
   the visual recognition device is installed in a direction perpendicular to the conveying direction and the visual recognition device comprises a 3D camera;
   the dispersion device comprises a plurality of scattering belt conveyors arranged in a divergent state in the conveying direction, and the plurality of scattering belt conveyors are driven separately by a plurality of servo motors;
   the separation device comprises a plurality of separating belt conveyors arranged into a matrix in the conveying direction, and each separating belt conveyor is separately driven by a servo motor; and
   the side-approaching device is an inclined barrel roll.

8. The side-by-side parcel separation device according to claim 7, wherein each scattering belt conveyor comprises a plurality of V-belts driven by a corresponding servo motor,
   the plurality of V-belts are connected to a V-belt axle through cross universal couplings, and
   the servo motor drives the V-belt axle through a synchronous belt wheel and a synchronous belt.

9. The side-by-side parcel separation device according to claim 7, wherein each separating belt conveyor comprises a conveyor belt driven by a servo reducer and belt wheels,
   a tensioning belt is disposed around the belt wheels on two sides, and the tensioning belt is sequentially connected to a driving roller, a tensioning roller installed on a tensioning crank shaft, a tensioning handle and a spring.

10. The side-by-side parcel separation method according to claim 3, wherein the dispersion device comprises a plurality of scattering belt conveyors arranged in a divergent state in the conveying direction, and the plurality of scattering belt conveyors are driven separately by a plurality of servo motors.

11. The separation device according to claim 7, wherein in the step of separation, when the detected parcels share identical position information, size information of the detected parcels is compared, and a largest parcel is identified as the first parcel.

12. The separation device according to claim 11, wherein
a motor speed of a separating belt conveyor conveying the first parcel, recognized by the image recognition algorithm, is increased;
motor speeds of the plurality of separating belt conveyors conveying the parcels behind are reduced or rotation is stopped until the first parcel completely exceeds other parcels;
the parcels are transported to the side-approaching device separately in sequence.

13. The separation device according to claim 12, wherein the different parcels arriving at the side-approaching device are delivered to one side in a conveying direction of a roller to form a single-row queue.

* * * * *